J. W. HILFRANK.
CASTER.
APPLICATION FILED SEPT. 10, 1912.
1,061,912.
Patented May 13, 1913.
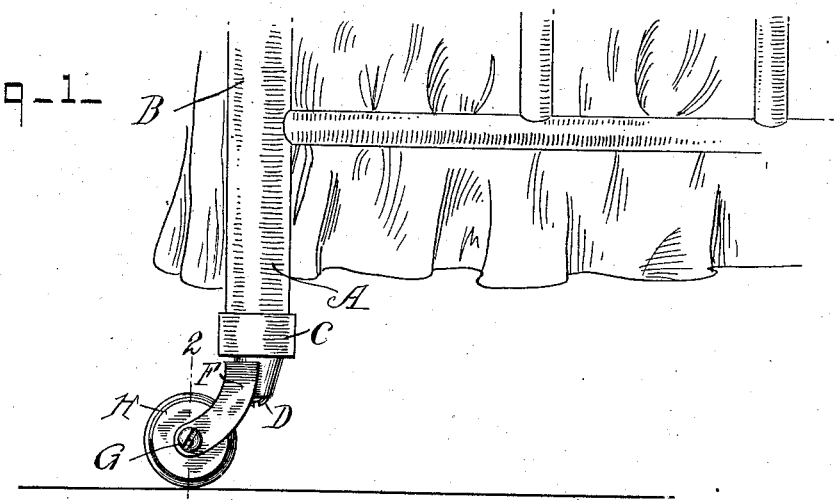
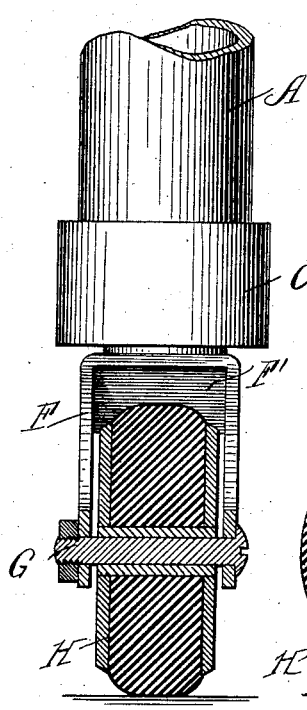
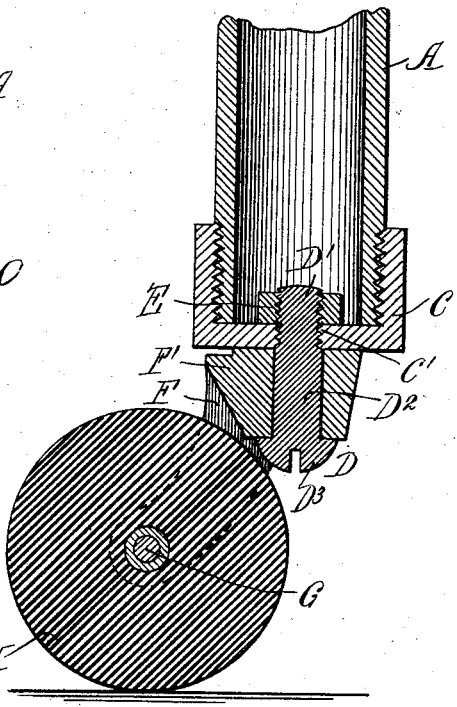
WITNESSES
Frank C. Palmer
INVENTOR
John Willis Hilfrank,
BY
ATTORNEYS

UNITED STATES PATENT OFFICE.

JOHN WILLIS HILFRANK, OF WHITE PLAINS, NEW YORK.

CASTER.

1,061,912.   Specification of Letters Patent.   Patented May 13, 1913.

Application filed September 10, 1912. Serial No. 719,505.

*To all whom it may concern:*

Be it known that I, JOHN WILLIS HIL-FRANK, a citizen of the United States, and a resident of White Plains, in the county of Westchester and State of New York, have invented a new and Improved Caster, of which the following is a full, clear, and exact description.

The invention relates to casters, such as are used on the hollow legs of metal bedsteads and like articles, and its object is to provide a new and improved caster arranged to permit of conveniently applying the caster to the terminal of the hollow leg and to insure the proper working of the caster when moving the bedstead or other article about.

For the purpose mentioned, use is made of a leg mount in the form of a cap screwing on the terminal of a hollow leg, the cap being provided with a central threaded bore in which screws the threaded upper end of a pintle, the latter having a smooth lower portion on which is swiveled a pair of jaws carrying the caster wheel, the upper threaded end of the pintle being engaged by a jam nut screwing against the cap to lock the pintle in place.

A practical embodiment of the invention is represented in the accompanying drawings forming a part of this specification, in which similar characters of reference indicate corresponding parts in all the views.

Figure 1 is a side elevation of the caster as applied to the leg of a bedstead; Fig. 2 is an enlarged cross section of the same on the line 2—2 of Fig. 1; and Fig. 3 is an enlarged sectional side elevation of the same.

The lower end of the hollow leg A of a metal bedstead B is provided with an exterior screw thread on which screws the interior screw thread of a cap C closing the lower end of the leg A. The cap C is provided with a centrally-arranged threaded aperture C' in which screws the upper threaded end D' of a pintle D which is locked in place on the cap C by a jam nut E screwing on the threaded portion D' and abutting against the cap C, as plainly indicated in Fig. 3. The pintle D is provided with a lower smooth portion $D^2$ on which is swiveled the middle or connecting part F' of jaws F carrying an axle G on which the caster wheel H is mounted in the usual manner. The lower end of the pintle D is provided with a head $D^3$ to hold the jaws against disengagement from the pintle D.

It is understood that the under side of the cap C rests on the top of the middle portion F' of the jaws F, and the said middle portion is mounted to turn freely on the smooth portion $D^2$ of the pintle D, which latter in turn is securely fastened on the cap C by screwing therein and being locked thereto by the jam nut E.

It is also understood that the threaded portion D' of the pintle D permits of screwing the pintle D up in the cap C until the end of the said threaded portion is reached, and consequently the connecting top F' of the jaws F is mounted to turn only on the smooth portion $D^2$ of the pintle so that an easy turning of the jaws is had, and a free turning of the wheel H is had in the jaws.

The caster shown and described is constructed of comparatively few parts, which can be readily assembled, at the same time locating the axis of the pintle D in the axis of the leg A.

Having thus described my invention, I claim as new and desire to secure by Letters Patent:

1. A caster, comprising a cap provided with an interior screw thread adapted to screw on the lower threaded end of a tubular leg, the cap being provided with a central threaded bore, a pintle having a smooth lower portion, a threaded upper portion screwing in the said bore and a head on the lower smooth portion, a caster wheel, and jaws in which the said wheel is journaled and swiveled on the said smooth portion of the pintle.

2. A caster, comprising a cap provided with an interior screw thread adapted to screw on the lower threaded end of a tubular leg, the cap being provided with a central threaded bore, a pintle having a smooth lower portion, a threaded upper portion screwing in the said bore and a head on the lower smooth portion, a caster wheel, jaws in which the said wheel is journaled and swiveled on the said smooth portion of the pintle, and a jam nut screwing on the upper end of the said threaded pintle portion and abutting against the cap.

In testimony whereof I have signed my name to this specification in the presence of two subscribing witnesses.

JOHN WILLIS HILFRANK.

Witnesses:
 ANNA B. FIELD,
 JOHN B. AIKEN.

Copies of this patent may be obtained for five cents each, by addressing the "Commissioner of Patents Washington, D. C."